(12) United States Patent
Toms

(10) Patent No.: US 7,512,221 B2
(45) Date of Patent: Mar. 31, 2009

(54) SYSTEM AND METHOD FOR THE DETECTION AND TERMINATION OF FRAUDULENT SERVICES

(75) Inventor: Alvin David Toms, West Perth (AU)

(73) Assignee: Cerebrus Solutions Limited, Harlow (GB)

(*) Notice: Subject to any disclaimer, the term of this patent is extended or adjusted under 35 U.S.C. 154(b) by 968 days.

(21) Appl. No.: 11/046,200

(22) Filed: Jan. 28, 2005

(65) Prior Publication Data

US 2005/0185779 A1    Aug. 25, 2005

Related U.S. Application Data

(63) Continuation of application No. PCT/AU03/00978, filed on Jul. 31, 2003.

(51) Int. Cl.
*H04M 15/00* (2006.01)
*H04M 3/00* (2006.01)
*H04M 1/66* (2006.01)

(52) U.S. Cl. .............. 379/114.14; 379/127.02; 379/189; 379/196; 455/410

(58) Field of Classification Search ............ 379/114.14, 379/127.02, 144.03, 188, 189, 195, 196, 379/88.01, 88.02; 455/410, 411; 704/221, 704/243, 246
See application file for complete search history.

(56) References Cited

U.S. PATENT DOCUMENTS

| | | | |
|---|---|---|---|
| 5,502,759 A | 3/1996 | Cheng et al. | |
| 5,623,539 A | 4/1997 | Bassenyemukasa et al. | |
| 5,937,043 A * | 8/1999 | He | 379/114.14 |
| 6,078,807 A | 6/2000 | Dunn et al. | |
| 6,157,707 A * | 12/2000 | Baulier et al. | 379/189 |
| 6,327,345 B1 * | 12/2001 | Jordan | 379/88.02 |
| 6,633,632 B1 * | 10/2003 | Harlow et al. | 379/188 |

FOREIGN PATENT DOCUMENTS

| | | |
|---|---|---|
| EP | 598469 A2 | 5/1994 |
| WO | WO 96/08907 A2 | 3/1996 |
| WO | WO 02/21812 A | 3/2002 |

OTHER PUBLICATIONS

Supplementary European Search Report for EP 03 73 9882 Apr. 10, 2006.

* cited by examiner

*Primary Examiner*—Quoc D Tran
(74) *Attorney, Agent, or Firm*—Knobbe Martens Olson & Bear LLP

(57) ABSTRACT

A system is disclosed for the automatic detection of fraudulent activity on a transaction network, for which each transaction over the network has an associated identifier. In one embodiment, the system includes voice comparison means for comparing a first sampled voice of a user of a first transaction with a subsequently sampled voice of a user of a subsequent transaction having an identical identifier to that of the first transaction. Control means in the form of a voice-based fraud detection engine is provided for determining, from said comparison, a profile of user usage that is representative of a total number of different users of the associated identifier. In a preferred embodiment, the system also includes voice sampling means for sampling a voice of the user of the first transaction to generate a first voice sample.

41 Claims, 11 Drawing Sheets

| ID Type | Land-Line |
|---------|-----------|
| ID | 1 |
| TH Neg | 12 |
| N Neg | 3 |
| TH Pos | 25 |
| N Pos | 8 |

| ID Type | Mobile |
|---------|--------|
| ID | 2 |
| TH Neg | 4 |
| N Neg | 2 |
| TH Pos | 40 |
| N Pos | 0 |

Figure 8

SYSTEM AND METHOD FOR THE DETECTION AND TERMINATION OF FRAUDULENT SERVICES

RELATED APPLICATIONS

This application is a continuation of and claims the benefit of PCT/AU2003/000978 under 35 U.S.C. §§ 365 and 120, filed on Jul. 31, 2003 and published in English on Feb. 5, 2004, which in turn takes priority from GB 0217769.9 and GB 0222643.9, each of which are incorporated by reference.

FIELD OF THE INVENTION

The present invention relates to a system and method for the detection and termination of fraudulent activity over a transaction network through the use of voice sampling means. In particular, but not exclusively, the invention relates to a method and system for detecting fraudulent activity implemented over a mobile or landline telecommunications network.

BACKGROUND OF THE INVENTION

Telecommunications networks permit the reliable, rapid, and secure exchange of information for individuals and businesses on local, regional, and global scales. Such networks are fundamental to the operation of all electronic commerce (e-commerce) and mobile commerce (m-commerce) systems, which are revolutionizing the business methods of companies across the world. Because of the desirability of the services provided by the networks, they are popular targets for criminals who attempt to defraud the network operators by stealing the services they provide and selling them on to third parties at a substantial discount. For example, it is known that criminals steal network time that is assigned to a calling tariff, and then sell this stolen time on to third parties. The same problem is encountered with pre-paid call time. The criminals are aided in this enterprise by the anonymity of telecommunications networks and the insecurity of their physical infrastructure. It is also relatively easy to gain access to hardware from which fraudulent attacks can be launched.

Fraud is not only a serious problem for the operators of telecommunications networks, but also for the providers of services that make use of them. In addition to the criminal acts of selling stolen services to third parties, the fraudulent use of credit and other payment cards for purchasing goods and services over telecommunications networks is a persistent occurrence. One of the primary problems with such fraudulent acts is the cost implications of providing services that ultimately are not paid for. To combat fraud, sophisticated fraud detection systems are used to monitor the activity on a network for suspicious behavior that may indicate that a fraud is in progress. Some systems operate by comparing a voice sample of a user of a telephone number with a pre-stored voice print of a legitimate user. If the voice sample does not match the voice print, it is taken as an indication of a fraudulent transaction. However, systems such as this are relatively complex and, as a result, their reliability tends to be rather low. As a consequence, there is a need for a system's operator to employ large fraud investigation teams to analyse each possible fraud in greater detail so as to determine whether a fraud has actually been identified, and, if so, to authorize the suspension of the service that is being exploited.

It is an object of the present invention to provide a system and method of reduced complexity for detecting fraudulent transactions, and which reduces the human contribution requirement to the fraud detection process. It is a further object of the invention to provide a method and system for detecting fraudulent transactions of improved reliability.

SUMMARY OF CERTAIN INVENTIVE ASPECTS

According to a first aspect of the present invention, there is provided a fraud detection system for detecting fraudulent activity on a transaction network, for which each transaction over the network has an identifier associated therewith, the system comprising:

a voice comparator for comparing a first sampled voice of a user of one of the identifiers with a subsequently sampled voice of a user of the same identifier taken during a subsequent use of said same identifier;

a profiler for building a profile of usage by users of said same identifier based on the voice comparisons, such that the profile is representative of a number of different users of the identifier; and, a fraud detector for comparing the number of different users represented in the profile as using the identifier to a threshold indicative of fraudulent use, wherein in the event that the number of users exceeds the threshold a fraud alert signal is generated.

According to a second aspect of the present invention, there is provided a system for the automatic detection of fraudulent activity on a transaction network, for which each transaction over the network has an identifier associated therewith, the system comprising voice comparison means for comparing a first sampled voice of a user of a first transaction with a subsequently sampled voice of a user of a subsequent transaction having an identical identifier to that of the first transaction, and control means for determining, from said comparison, a profile of user usage that is representative of a number of different users of the identifier, for comparing the profile of user usage with a threshold for fraudulent use and for generating a fraud condition signal in the event that the profile of user usage exceeds said threshold.

The voice of the user of the first transaction may be sampled by the operator of the system (e.g. a network service provider). If, for example, the system is used to monitor fraudulent telephone calls from a mobile telephone having an identifier in the form of a mobile telephone number, the system operator may sample the voice of the user at the time of sale of the service (e.g. when a mobile telephone number is assigned to a user). This first voice sample may be converted into a voice print by suitable speaker verification software and stored in storage means for comparison with voice samples that are taken during subsequent telephone calls having this identifier. The database of stored voice prints derived from voice samples for different identifiers may also be created and maintained by a service provider other than the system operator.

When a subsequent transaction occurs, having an identical identifier to that of the first transaction, the system operator samples the voice of the user of the subsequent transaction to generate a subsequent voice sample which is then compared with the stored voice print derived from the first voice sample for the purpose of determining the profile of user usage.

In this embodiment, the system therefore preferably also includes voice sampling means for sampling a voice of a user of the first transaction to generate a first voice sample and for generating a first voice print from said first voice sample, and voice print storage means for storing, with the associated identifier, the first voice print for comparison with a subsequent voice sample that is generated for the subsequent transaction.

In an alternative embodiment, someone other than the system operator may sample the voice of the user for the first transaction, and may update and maintain suitable voice print storage means for the voice prints derived from the voice samples and the associated identifiers. The system of the present invention need not therefore be manufactured to include the voice print storage means for storing the voice prints.

The present invention is particularly suitable for application to telecommunication network transactions where fraud is prevalent and, for example, where fraudsters steal the pre-paid services provided by network operators to sell on to third parties. In this case, the transactions implemented on the network are telephone calls, for example, from mobile or landline telephones, and the identifier for each transaction is the unique telephone number, often referred to as the A-number, identifying the origin of the call.

The profile of user usage provides an indication of the number of different users associated with a single transaction identifier. It is a particular benefit of the present invention that there is no need to positively identify the voice of the user from the voice sample(s), but rather a determination is made as to whether the number of negative identifications (i.e. the number of voice samples which do not correspond to a previously stored voice print) suggests fraudulent use. This reduces the required sophistication level of the voice comparison means forming part of the system. The present invention stems from the realisation by the inventor, that the number of different users there are of an identifier can be used to provide an indication of whether there is fraudulent use of the identifier. A further benefit of the invention is that it permits the use of high speed verification systems that generate small voice prints from voice samples, even though such systems may have relatively high error rates. As a result the throughput of the invention is maximised and its storage requirements are minimised.

In a preferred embodiment, the system also includes selection means configured to initiate sampling of the voice of the user by the voice sampling means only for selected transactions. This provides the advantage that the processing, voice sampling and data storage requirements of the system are reduced.

Preferably, the voice sampling means is configured to sample a voice of a user several times for each transaction. This provides the benefit that if the fraudster is aware of such voice sampling schemes, any attempt to circumvent the fraud detection process can be prevented.

Preferably, the selection means includes a fraud detection system for determining whether a transaction has a fraudulent characteristic and for generating a fraud alert signal in the event thereof, and whereby voice sampling is initiated in response to generation of a fraud alert signal.

This embodiment of the invention uses a combined fraud detection apparatus and voice verification technology to identify frauds, and offers important benefits to network operators and service providers. The invention achieves far greater reliability than conventional fraud detection systems, making it possible to automatically suspend services that are being exploited without the need for a fraud investigation team. As a result, two major cost savings are achieved. Firstly, the size of the fraud investigation team can be substantially reduced (or eliminated altogether) because it is no longer required to investigate every suspicious event that occurs on a network. Secondly, because the network operator does not have to wait for the fraudulent transaction to be confirmed by a manual investigation before it is stopped, the time required to stop each fraudulent transaction is reduced, limiting the loss incurred.

As an alternative to providing the fraud detection system, the selection means may be configured to periodically initiate voice sampling of transactions (i.e. a voice sample is extracted for only selected transactions, for example every tenth transaction). Non-temporal non-fraud selection criterion are also possible, such as analysing only calls to international or premium-rate destinations.

The fraud detection system may be of known type, and may include means for comparing a user profile for the identifier with one or more characteristic of a transaction associated with the identifier, thereby to determine whether the transaction has a fraudulent characteristic. Typically, this may be done by comparing the user profile with transaction characteristics relating to, for example, call duration, destination and cost.

In a preferred embodiment, the voice comparison means is arranged to generate a negative comparative output signal in the event that the subsequent voice sample does not substantially match a stored voice print, and a positive comparative output signal in the event that the subsequent voice sample does substantially match a stored voice print.

The profile of user usage may include a representation of a total number of positive and/or negative comparative output signals generated by the voice comparison means. Alternatively, or in addition, the profile of user usage may include a representation of a percentage of total voice samples for which a negative and/or a positive comparative output signal is generated. The profile of user usage may also include a representation of a cumulative total of sequential voice samples originating from the same and/or different users.

The threshold for fraudulent use is selected according to the particular representation or representations provided by the profile of user usage with which it is compared. Thus, for example, a profile of user usage including a representation of the total number of negative comparative output signals may be compared with a threshold that is a maximum number of different users of the identifier that is representative of fraudulent use (i.e. the number of different users of the identifier above which use is considered fraudulent).

Preferably, the control means includes halt signal means for generating a halt signal which serves to halt sampling of transactions, for example voice sampling or sampling for analysis by the fraud detection system, for an identifier for which the profile of user usage provides a positive indication of non-fraudulent use.

Preferably, the control means is arranged to compare the profile of user usage with a threshold for non-fraudulent use, and wherein the halt signal means is arranged to generate the halt signal in the event that the profile of user usage exceeds said threshold for non-fraudulent use. The profile of user usage may include a representation of a percentage of the total number of comparative output signals that are positive for said identifier, and wherein said threshold for non-fraudulent use is a minimum percentage of transactions, having the same user, which is considered to provide a positive indication of non-fraudulent use. Thus, if a total number of positive comparative output signals generated for a particular identifier positively indicates there is only one or a small number of users of said identifier, as would be expected for non-fraudulent use, the halt signal is generated to terminate further sampling of transactions having this identifier.

In a further preferred embodiment, the system may also include a record storage means, typically in the form of an analysis profile archive, for storing data records that are representative of the profile of user usages. The identifier may be any alphabetic, numeric, or alphanumeric data or information that is normally associated only with a single individual or small number of individuals, and includes bank account numbers, credit card numbers, or any identifier associated with a physical object, such as a telephone, which is also normally used only by a single individual or small number of individuals. A voice print consists of any information that is required for a voice comparison means or voice verification device to distinguish one person from a large set of other people with high probability.

The system is equally applicable to payment transactions implemented over a telecommunications network, or any other system where a sample of the voice of the initiator of a transaction can be obtained. In this case, the transaction is a payment for goods and/or services. The payment transaction is implemented by a user who reads a payment card number to a goods or service provider over the telecommunications network. The payment card number represents a unique identifier, for which a voice sample of the user is obtained, and which is then converted to a voice print, stored and compared with subsequent voice samples obtained for subsequent payments from the same payment card.

In a preferred embodiment, the profile of user usage also includes a representation of one or more characteristics of the associated identifier, for example the type of telephone with which an A-number identifier or payment card number identifier is associated.

Preferably, the control means includes adjustment means for adjusting at least one of the thresholds for fraudulent use and the threshold for non-fraudulent use for an associated identifier in response to one or more of said associated identifier characteristics. In this way, different types of calls can have different thresholds associated therewith. For example, for calls originating from landline telephones, it may be expected that there will be a higher number of different users of the telephone than for a mobile telephone. The threshold beyond which there is an indication of fraudulent use can therefore be adjusted to further improve the success rate of the system.

Preferably, the system also includes an analysis profile archive for storing the profile of user usage. It will be appreciated that the profile of user usage may include a representation of the number of different users of an identifier, and a representation of the or each identifier characteristic, and may be stored in a common computer memory location or in separate and distinct computer memory locations.

In a preferred embodiment, the control means is arranged to automatically supply the fraud condition signal to the transaction network, thereby to implement automatic termination of the transaction in the event that the threshold for fraudulent use is exceeded. The fraud condition signal may also implement automatic termination of other services associated with the indentifier. This removes the need for human involvement in the analysis of fraud alerts generated by a fraud detection system, and thus reduces network operator costs associated with providing a fraud investigation team.

According to a third aspect of the invention, there is provided a system for the automatic detection of fraudulent activity on a transaction network, for which each transaction over the network has an identifier associated therewith, the system comprising a voice comparator for comparing a first sampled voice of a user of a first transaction with a second sampled voice of a user of a subsequent transaction having an identical identifier to that of the first transaction, and a controller for determining, from said comparison, a profile of user usage for the identifier that is representative of how many different users of the identifier there are, for comparing the profile of user usage with a threshold for fraudulent use and for generating a fraud condition signal in the event that the profile of user usage exceeds said threshold.

In a preferred embodiment, the third aspect of the invention also includes a voice sampling device for sampling the voice of the user of the first transaction, for generating a first voice sample and for deriving a first voice print from said first voice sample, and a voice print storage archive for storing the first voice print with the associated identifier.

According to a fourth aspect of the invention, there is provided a method for the automatic detection of fraudulent activity on a transaction network, for which each transaction over the network has an identifier associated therewith, the method comprising:
sampling a first voice of a user of one of the identifiers;
subsequently sampling a second voice of a user of the same identifier;
comparing the first sampled voice with the subsequently sampled voice;
profiling usage by users of said same identifier based on the voice comparisons, such that the profile is representative of a number of different users of the identifier;
comparing the number of different users represented in the profile as using the identifier to a threshold indicative of fraudulent use; and,
generating a fraud alert signal in the event that the number of users exceeds said threshold.

According to a fifth aspect of the invention, there is provided a method for the automatic detection of fraudulent activity on a transaction network, for which each transaction over the network has an identifier associated therewith, the method comprising comparing a first sampled voice of a user of a first transaction with a subsequent sampled voice of a user of a subsequent transaction having an identical identifier to that of the first transaction, determining, from said comparison, a profile of user usage for said identifier that is representative of a number of different users of the identifier, comparing the profile of user usage with a threshold for fraudulent use, and generating a fraud condition signal in the event that the profile of user usage exceeds said threshold.

The method of the fourth or fifth aspect preferably includes sampling a voice of the user of the first transaction to generate a first voice sample, deriving a first voice print from the first voice sample, storing the first voice print with the associated identifier in a voice print archive, sampling a voice of the user of the subsequent transaction to generate a subsequent voice sample, and comparing the subsequent voice sample with the first voice print for the purpose of determining the profile of user usage for said identifier.

The method preferably includes the step of automatically supplying the fraud condition signal to the transaction system to implement automatic termination of the transaction in the event that the threshold of non-fraudulent use is exceeded.

The method may further include providing an initial indication of whether a transaction has a fraudulent characteristic using fraud detection means, generating a fraud alert signal in the event that the initial indication is that the transaction has a fraudulent characteristic, and selectively initiating voice analysis of transactions having this identifier in response to generation of the fraud alert signal by the fraud detection system.

According to a sixth aspect of the present invention, there is provided a fraud detection system for detecting fraudulent activity on a transaction network, for which each transaction over the network has an identifier associated therewith, the system comprising:

a voice based fraud detection engine for sampling the voice of each user of the identifier during each use of the identifier using a voice analysis technique to identify the number of unique users of the identifier and to indicate the presence of fraudulent use when the number of unique users of the identifier exceeds a threshold; and, a fraud alert generator to signal presence of fraudulent activity when the voice based fraud detection engine indicates the presence of fraud.

According to a seventh aspect of the present invention, there is provided a fraud detection system for detecting fraudulent activity on a transaction network, for which each transaction over the network has an identifier associated therewith, the system comprising:

a use characteristics fraud detection engine for analysing characteristics of the use of the network to determine whether fraud is indicated in the use of one of the identifiers;

a voice based fraud detection engine for sampling the voice of each user of the identifier during each use of the identifier using a voice analysis technique to identify the number of unique users of the identifier and to indicate the presence of fraudulent use when the number of unique users of the identifier exceeds a threshold; and, a fraud alert generator to signal presence of fraudulent activity when both of the use characteristics fraud detection engine and the voice based fraud detection engine indicate the presence of fraud.

Preferably the voice based fraud detection engine of the system of the seventh and eighth aspects preferably comprises:

a voice comparator for comparing a first sampled voice of a user of one of the identifiers with a subsequently sampled voice of a user of the same identifier taken during a subsequent use of said same identifier;

a profiler for building a profile of usage by users of said same identifier based on the voice comparisons, such that the profile is representative of a number of different users of the identifier; and, a fraud detector for comparing the number of different users represented in the profile as using the identifier to a threshold indicative of fraudulent use, wherein in the event that the number of users exceeds the threshold a fraud alert signal is generated.

Preferably use characteristics fraud detection engine analyses one or more of the following to determine that there is an indication of fraudulent use of the identifier: the rate of use of the identifier, the manner of use of the identifier, the duration of each use of the identifier, or the types of transaction conducted with the identifier.

According to a eighth aspect of the invention, there is provided a method for the automatic detection of fraudulent activity on a transaction network, for which each transaction over the network has an identifier associated therewith, the method comprising:

sampling the voice of each user during each use of said identifier and using a voice analysis technique to identify the number of unique users of the identifier to indicate the presence of fraudulent use in the event that the number of unique users of the identifier exceeds a threshold indicative of fraudulent use; and, generating a fraud alert for signalling presence of fraudulent activity when the voice based analysis indicates the presence of fraud.

According to a ninth aspect of the invention, there is provided a method for the automatic detection of fraudulent activity on a transaction network, for which each transaction over the network has an identifier associated therewith, the method comprising:

analysing characteristics of the use of the network to determine whether fraud is indicated in the use of one of the identifiers;

sampling the voice of each user during each use of said identifier and using a voice analysis technique to identify the number of unique users of the identifier to indicate the presence of fraudulent use in the event that the number of unique users of the identifier exceeds a threshold indicative of fraudulent use; and, generating a fraud alert for signalling presence of fraudulent activity when both of the use characteristics analysis and the voice based analysis indicate the presence of fraud.

Preferably the voice analysis technique of the method of the ninth or tenth aspect comprises the steps of:

comparing one of the sampled voices with a subsequently sampled other of the voices;

profiling usage by users of said same identifier based on the voice comparisons, such that the profile is representative of a number of different users of the identifier;

comparing the number of different users represented in the profile as using the identifier to a threshold indicative of fraudulent use; and, generating a fraud alert signal in the event that the number of users exceeds said threshold.

Preferably analysis of characteristics of the use of the network includes the steps of: analysing one or more of the following to determine that there is an indication of fraudulent use of the identifier: the rate of use of the identifier, the manner of use of the identifier, the duration of each use of the identifier, or the types of transaction conducted with the identifier.

It will be appreciated that the preferred and/or optional features of the first, and second embodiments of the invention, are equally applicable to the third and seventh aspects of the invention, and for implementation in the method of the fourth, fifth or eighth aspect of the invention, singly or in appropriate combination.

The term transaction is used throughout this specification to refer to all business transactions, exchanges of information, goods, services, or funds, and expressions of intentions to make such exchanges, during which samples of voices of users of the identifier with which the transaction is associated can be obtained, and includes telephone calls, and purchases made on credit cards, electronic money, and electronic commerce (e-commerce) and mobile commerce (m-commerce) systems.

The term identifier is used throughout this specification to refer to an identifying label of a network element or a facility or other thing used to conduct a transaction, which may be the subject of fraudulent use. For example, a mobile phone or landline phone may be the network element, with the identifier being the telephone number of that telephone. In another example, the facility may be a credit card and the identifier may be the card number or (separately or in combination) a personal identification number or password. For convenience the terminology "use of the identifier" (and the like) is used because it is usually the phone number that is billed or the credit card number (or similar) that a charge is incurred against. Use in this sense is not intended to be limiting.

For the purpose of this specification, the term "voice sampling" is intended to refer not only to discrete sampling of a users voice, but to continuous sampling also, where a continuous data stream is generated to represent the voice of the transaction user. A reference to the "matching" or "mismatching" of a voice sample and a voice print would be understood by persons familiar with this art, and examples of how a determination of a match or a mis-match may be carried out are given in the following description.

For the avoidance of doubt, it is restated that the comparison of one voice sample with a voice print is not intended to be carried out for the purpose of determining when there is a definite match in any individual case, but to monitor when there are mismatches between samples that suggest a large number of different users of an identifier.

BRIEF DESCRIPTION OF DRAWINGS

The invention will now be described, by way of example only, with reference to the following drawings in which:

FIG. 8 is an illustration of a record representing a profile of user usage of the system shown in FIG. 3;

DETAILED DESCRIPTION OF CERTAIN INVENTIVE EMBODIMENTS

Figure 1:
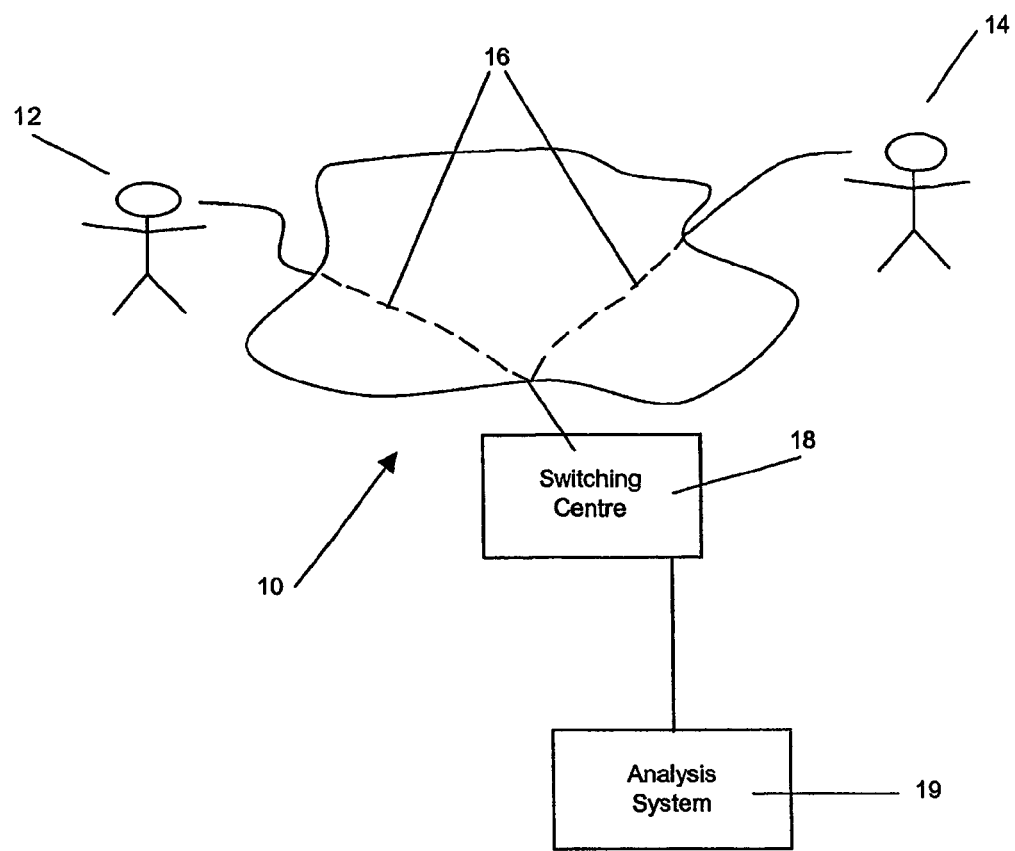
FIG. 1 is a schematic diagram illustrating a generic arrangement of several embodiments of the present invention for implementing automatic fraudulent transaction detection in a transaction network.

Referring to FIG. 1, a transaction network, used in conjunction with the embodiments of the present invention, referred to generally as 10, takes the form of a telecommunications network for the exchange of telephone transactions or calls, represented by dashed lines 16, between first and second users 12, 14 respectively. The first user 12 originates a telephone call from a telephone having a first telephone number, and the call is transmitted, via a telecommunications network, to the second user 14 of a telephone having a second telephone number to which the call is directed. The telecommunications network 10 includes a switching centre 18, which routes the call from the first user 12 to the desired second user 14. The switching centre 18 also communicates information relating to each transaction to an analysis system 19 of embodiments of the present invention, which serves to analyse characteristics of some or all of the calls via the telecommunications network 10 to determine whether they are of fraudulent nature.

Figure 2:
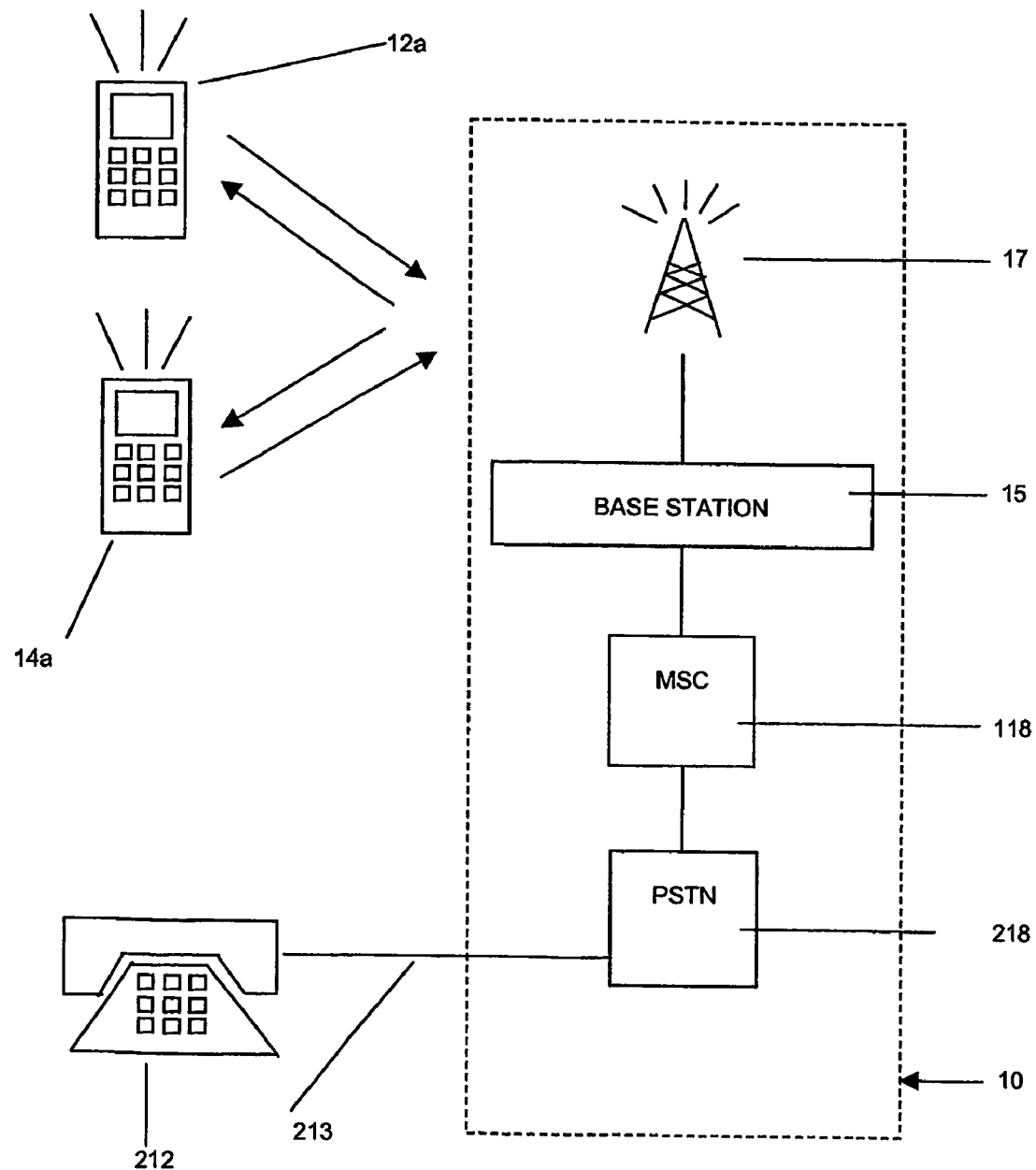
FIG. 2 is a detailed schematic diagram illustrating a telecommunications network of FIG. 1 with which the system of the present embodiments may be used.

FIG. 2 shows an usual form of the transaction network of FIG. 1 for use with a preferred embodiment of the present invention, where a telephone call is transmitted, via a telecommunications network 10, from a first, originating mobile telephone handset 12a to a second, receiving mobile telephone handset 14a. A Mobile Switching Centre (MSC) 118 controls the routing of calls between the originating and receiving handsets 12a, 14a. During the call, the transmission and receipt of signals to and from the telephone handsets 12a, 14a is controlled by means of a base station 15 and an antenna assembly 17 of the network 10 in accordance with network operator requirements, in a known manner.

In practice, the network 10 will also include a Public Switched Telephone Network (PSTN) 218 to control the routing of calls to and from landline telephones, such as that shown at 212, which communicate with the network 10 through PSTN lines 213. The MSC 118 and the PSTN 218 are configured to provide routing of landline to landline calls, calls between landline telephones and mobile telephones (and vice versa) and mobile to mobile calls, as required.

Figure 3:
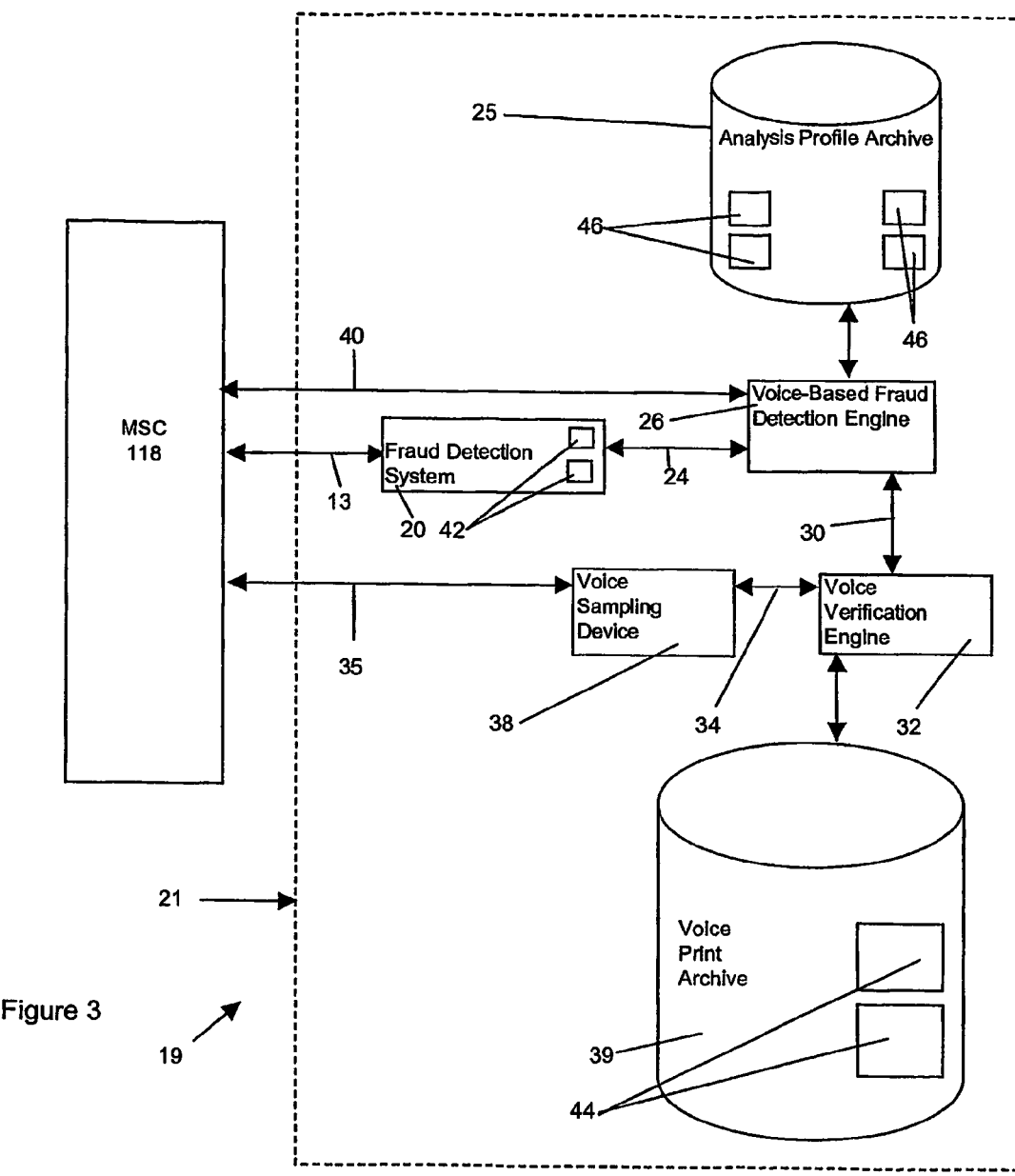
FIG. 3 is a schematic block diagram illustrating a system according to a preferred embodiment of the present invention for the automatic fraudulent transaction detection and termination when applied to a telecommunications network, such as that shown in FIG. 2.

FIG. 3 shows the details of the preferred embodiment of the analysis system 19 in FIG. 1. The system 19 includes a voice-based fraud detection system, referred to generally as 21 and shown in dashed lines, which implements voice verification technology to determine reliably whether a fraudulent transaction is in progress. The system is based on the principle that transactions (such as telephone calls) that are made using an identifier (such as a particular telephone number) that is used normally only by one or a small number of individuals, can be monitored for use by a larger number of individuals, which, if detected, provides an indication that there is fraudulent use of the identifier.

The voice-based fraud detection system 21 has three major processing elements, including a control means or controller in the form of a voice-based fraud detection engine 26, a voice comparison means in the form of a voice comparator or voice verification engine 32 and a voice sampling means in the form of a voice sampling device 38. The voice-based fraud detection engine 26 provides control signals 30 for the voice verification engine 32, which in turn is arranged to control the voice sampling device 38 through control signals 34 for the purpose of extracting a sample of the voice of the transaction user (i.e. the voice of the user making the originating call from the telephone 12a in FIG. 2), from which a voice print is then derived. Following a series of voice analysis steps, if it is determined that a fraudulent transaction is taking place the voice-based fraud detection system 21 provides control signals 40 to the MSC 118 of the network 10 to initiate termination of a fraudulent transaction in an appropriate manner. If the call originated from a landline telephone, the control signal 40 would be provided to the PSTN 218 to initial termination of the call.

The voice-based fraud detection system 21 also has an associated voice print storage means, in the form of a voice print archive 39, for storing voice prints that are generated from voice samples extracted by the voice sampling device 38. The voice-based fraud detection system 21 also includes a record storage means, in the form of an analysis profile archive 25, for storing data records 46 in association with the telephone number. More specifically, a record 46 is created in the associated analysis profile archive 25 to represent the different number of users of a particular identifier, as described further below.

The system 21 further includes a selection means which is operable to ensure only certain ones of the calls transmitted over the network are selected for analysis by the voice-based fraud detection engine 26. In this embodiment of the invention, the selection means takes the form of a fraud detection system 20 for identifying calls having a fraudulent characteristic and, thus, for which fraudulent use of the originating telephone 12a is suspected. The provision of such a selection means is beneficial as it reduces the processing load of the overall system, reducing its hardware requirements and improving its speed of response.

In use, transaction data signals 13 from the network 10 are supplied to the fraud detection system 20, which monitors transaction telephone calls and analyses a range of parameters which are characteristic of the calls, such as the number of the mobile telephone or landline from which the call originated (commonly referred to as the "A-number"), the destination of the call (for example, the destination country), the duration of the call and the cost of the call. The A-number provides an identification code, or identifier, which is unique to the user of each originating telephone 12a. In the case of a mobile telephone, the A-number may be defined by a SIM card, which is usually issued to a user by the service provider for use in one or a small number of mobile telephone handsets only. It is most common for a SIM card to be used only in one mobile handset, but it will be appreciated that use in more than one handset can occur legitimately, for example if a couple share a SIM card for use in both of their handsets, or if a SIM card is transferred to a friend's or colleague's handset to make certain calls. In the case of a landline telephone, the A-number is allocated by a service provider for use, typically, at a single telephone connection location or may be initiated via a PABX system.

The amount of money that fraudsters can make from stolen network time is limited by the charges normally made for the services that they can provide with it, and the percentage of the time that they have access to the network that they are able to sell. The first of these restrictions means that fraudsters usually offer high cost services, such as international, mobile, and premium rate calls, whilst the second means that frauds are usually characterized by periods of dense calling during which the defrauded services are rarely idle. These are the characteristics that conventional fraud detection systems use to identify frauds, and the fraud detection system 20 operates using criteria such as these to establish whether a call is of fraudulent character.

For each A-number, characteristic data relating to calls originating from the telephone 12a is stored in a memory of the fraud detection system 20 in association with the relevant identifier, such that for each identifier a user profile 42 is established. Such user profiles 42 may include data relating to, for example, the originating location of the call, the cost of calls, the duration of calls and their destinations.

Should a call originating from the telephone 12a associated with a particular A-number deviate by an abnormal amount from the associated user profile, the fraud detection system 20 generates a fraud alert signal 24 for supply to the voice-based fraud detection engine 26. This causes the voice-based fraud detection system 21 to analyse the voice of users of calls originating from the A-number. Analysis continues until such time as the voice-based fraud detection system 21 determines whether a fraud is in progress, or that a fraud is not in progress.

In addition to the first level of analysis of transactions provided by the fraud detection system 20, the voice-based fraud detection system 21 provides a second level of analysis of selected identifiers, by monitoring the number of different speakers initiating calls from particular A-numbers. This enables fraud to be detected with unprecedented speed and reliability. Because each of a fraudster's customers may only require a small amount of network time, a fraudster is forced to sell stolen services to a large number of different customers in order to achieve high efficiency. Most frauds are therefore characterized by large numbers of calls associated with a specific A-number being initiated by a large number of different speakers. This is in contrast to how services are normally used. Typically, an A-number will serve small groups of individuals (such as families) in the case of landline telephones and usually only one individual in the case of mobile telephones. The present invention, as implemented in the described embodiments, exploits this fundamental and necessary property of fraudulent operations by implementing the voice-based fraud detection system 21 to analyse the number of different users of any given A-number.

In general terms, the event that a fraud alert signal 24 is generated by the fraud detection system 20, the voice verification engine 32 provides the control signal 34 to the voice sampling device 38, which in turn sends an instruct signal 35 to components of the network 10, for example probes and switches (not shown), to capture samples of the voices of the users of the current transaction. The voice samples are passed back to the voice verification engine 32, which compares voice prints that are associated with the same identifier with the current voice sample 44 for the purpose of determining whether there is a match (e.g. the current voice sample could have generated one of the stored voice prints 44) or a mismatch (e.g. the current voice sample could not have generated one of the stored voice prints 44).

More specifically, when the voice sampling device 38 supplies an extracted voice sample to the voice verification engine 32, the voice verification engine 32 checks to see whether the voice print archive 39 already contains any voice prints associated with the current A-number 46. If, for the particular A-number in question there is no stored voice print 44 in the voice print archive 39 with which the current voice sample can be compared, a new, first voice print 44 is created from the current voice sample and is stored in the voice print archive 39 for this A-number identifier. The system then waits for the next transaction having this identifier and another voice sample is taken.

If there is already a stored voice print 44 in the voice print archive 39 associated with the particular identifier 46, the voice verification engine 32 compares the current sample with the or each stored voice print 44 in the archive 39 and generates either a negative comparative output signal if the current voice sample could not have generated a stored voice print (i.e. a mismatch), or a positive comparative output signal if the current voice sample could have generated a stored voice print 44 (i.e. a match).

As shown in FIG. 3, the positive and/or negative comparative output signals 30 generated by the voice verification engine 32 are supplied to the voice-based fraud detection engine 26, which communicates with the analysis profile archive 25. A record 46 is created in the archive 25 for each A-number for which the fraud detection system 20 generates a fraud alert signal 24. The record 46 for each A-number contains information relating to the number of different voices of users of the A-number which are sampled, and thus represents a "profile of user usage" for a particular A-number. The record 46 representing the profile of user usage for each A-number is updated continuously as further voice samples are taken for each A-number, as further positive and/or negative comparative output signals are generated by the voice verification engine 32. If a negative comparative output signal is supplied to the voice-based fraud detection engine 26, the profile of user usage is updated to indicate that a new user has made a transaction with the A-number. If a positive comparative output signal is supplied to the voice-based fraud detection engine 26, the profile of user usage is updated to indicate that a previously recorded user of the A-number has made a further transaction with the A-number. The total number of negative comparative output signals therefore represents how many different users there are of a particular identifier.

Figure 4:
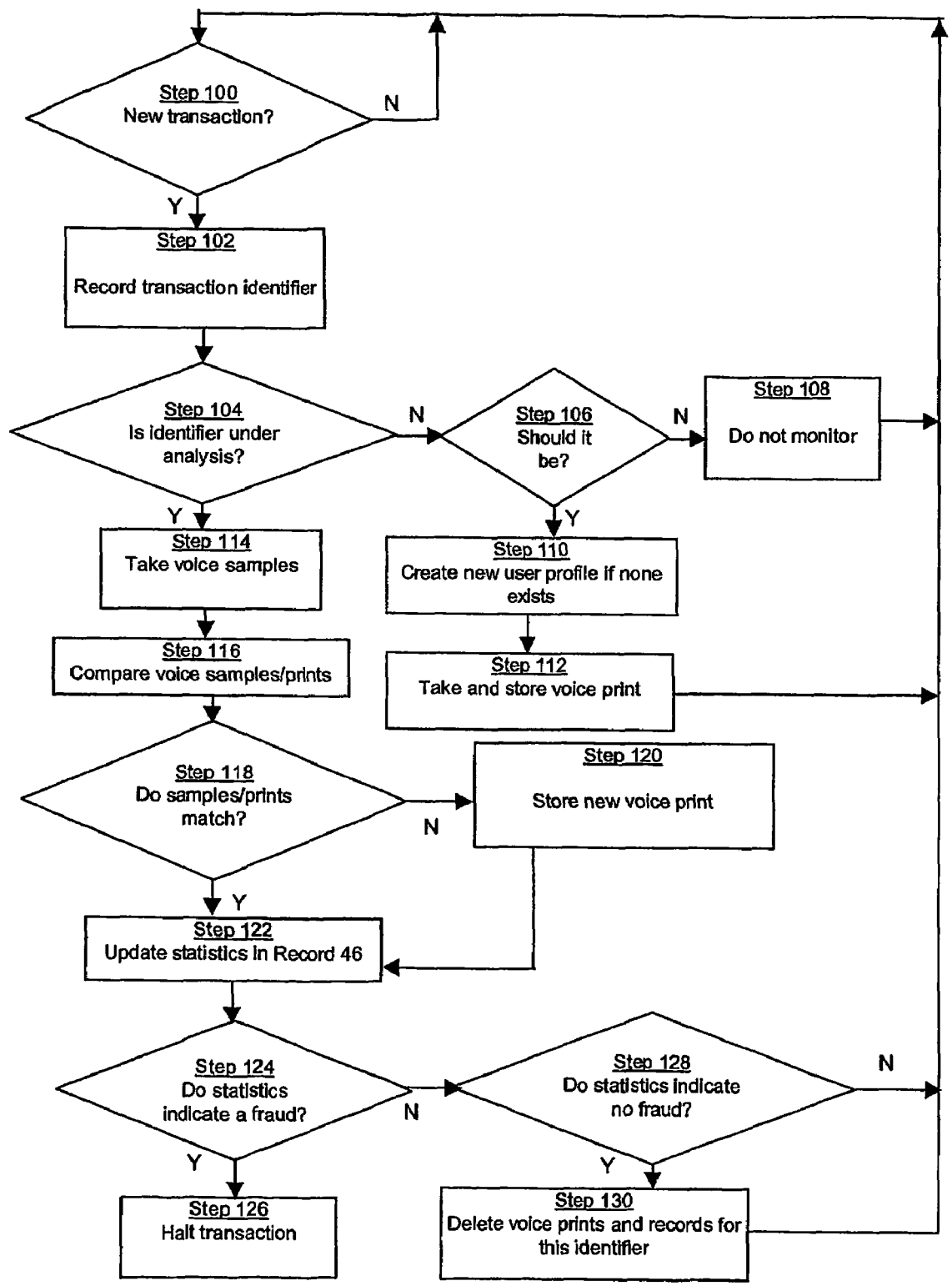
FIG. 4 is a flow diagram illustrating the steps of operation of the system shown in FIG. 3.

FIG. 4 is a flow diagram that illustrates the steps in the operation of the analysis system 19 shown in FIG. 3. At step 100, a check is made for whether the transaction in progress is a new transaction. Checks are continually made until a new transaction is identified. When a new transaction is identified, the A-number identifier is recorded by the voice-based fraud detection system 21 (step 102).

At step 104, a check is made by the voice-based fraud detection system 21 for whether the recorded A-number identifier is already subject to voice fraud analysis. If not, the voice-based fraud detection system 21 checks to see whether it should be (step 106) by checking whether the fraud detection system 20 generates any fraud alert signals 24 for the current transaction. If an alert signal 24 is generated, the voice-based fraud detection system 21 analyses all subsequent calls originating from the same A-number until it has determined whether a fraud is in progress, or not.

If the A-number is not currently subject to voice fraud analysis, and the fraud detection system 20 generates an alert signal 24, then at step 110 a new user profile is created for the A-number in the analysis profile archive 25. At step 112 a voice sample is taken and is converted into a voice print, which is stored in the voice print archive 39 ready for comparison with a voice sample from a subsequent call with the same identifier.

If it is determined at step 106 that no analysis is required (i.e. because the particulars of the transaction do not suggest fraudulent activity), and the identifier is not already subject to analysis, the transaction proceeds unmonitored (step 108).

If, at step 104, it is determined that the A-number in question is already subject to voice analysis, a voice sample is taken (step 114). At step 116 the current voice sample is compared with the or each voice print that is already stored in the voice print archive 39 for this A-number.

If the current voice sample does not match one of the stored voice prints (step 118), a new voice print is generated from the current voice sample and is added to the voice print archive (step 120). A negative or positive comparator output signal is generated as a result of the voice sample comparison step 118, and the appropriate record 46 in the analysis profile archive 25 is updated accordingly (step 122).

At step 124, a check is made for whether there is evidence of fraudulent activity by checking to see whether the number of negative comparator signals exceeds the threshold for fraudulent use. If this is the case, the transaction is halted (step 126) and further calls from this A-number are prevented. The system therefore permits automatic termination of services to A-numbers that have been compromised by fraudsters without the need for human intervention and analysis.

If necessary, further investigations may be initiated by a fraud investigation team to assess whether a fraudulent act has actually occurred. Alternatively, if the service provider does not want to automatically terminate the fraudulent activity, a fraud investigation team may investigate whether a fraud has actually occurred. This may be desirable if the fraudster is to be caught in the act for law enforcement purposes.

If, at step 124, the threshold for fraudulent use is not exceeded, a check is made to determine whether the statistics positively indicate that a fraud is not in progress. If no positive determination can be made (step 128), transactions associated with this A-number continue to be monitored. Alternatively, if the statistics positively indicate at step 128 that no fraud is in progress, the stored voice prints and the profile of user usage record 46 associated with the identifier may be deleted from the voice print archive 39 and the analysis profile archive 25 respectively (step 130).

The voice-based fraud detection system 21 is preferably configured to operate in various conditions so that the generation of a fraud condition signal 40 for automatic termination of a fraudulent transaction is provided not only as a result of a threshold of negative comparator signals being exceeded (for example, total number, percentage or successive), but also through comparison with a characteristic of the A-number which is stored in the analysis archive 25. Preferably, this characteristic of the A-number forms part of the record 46 representing the associated profile of user usage and is stored in the same computer memory location as the representation of the cumulative or percentage number of positive and/or negative comparative output signals.

By way of example, the A-number characteristic may be the type of telephone with which the A-number is associated, for example a landline telephone number or a mobile telephone number. It may be expected that landline telephones will have a higher number of different users than mobile telephones, and thus identifiers for landline calls can be set to have a higher threshold for fraudulent use. In this way family use of a landline telephone would be allowable and recognised as non-fraudulent, but use in the same way as, say, a public telephone booth would be suggestive of fraudulent use. For a mobile telephone, single user or dual-user use only may be expected, and so a lower threshold for fraudulent use is set.

The voice-based fraud detection engine 26 may be provided with sophisticated pre-conditions so as to generate a fraud condition signal 40 taking into account various A-number use factors. Other factors for consideration may be, for example, the relationship of the user with the service supplier and seasonal conditions.

Figure 5:
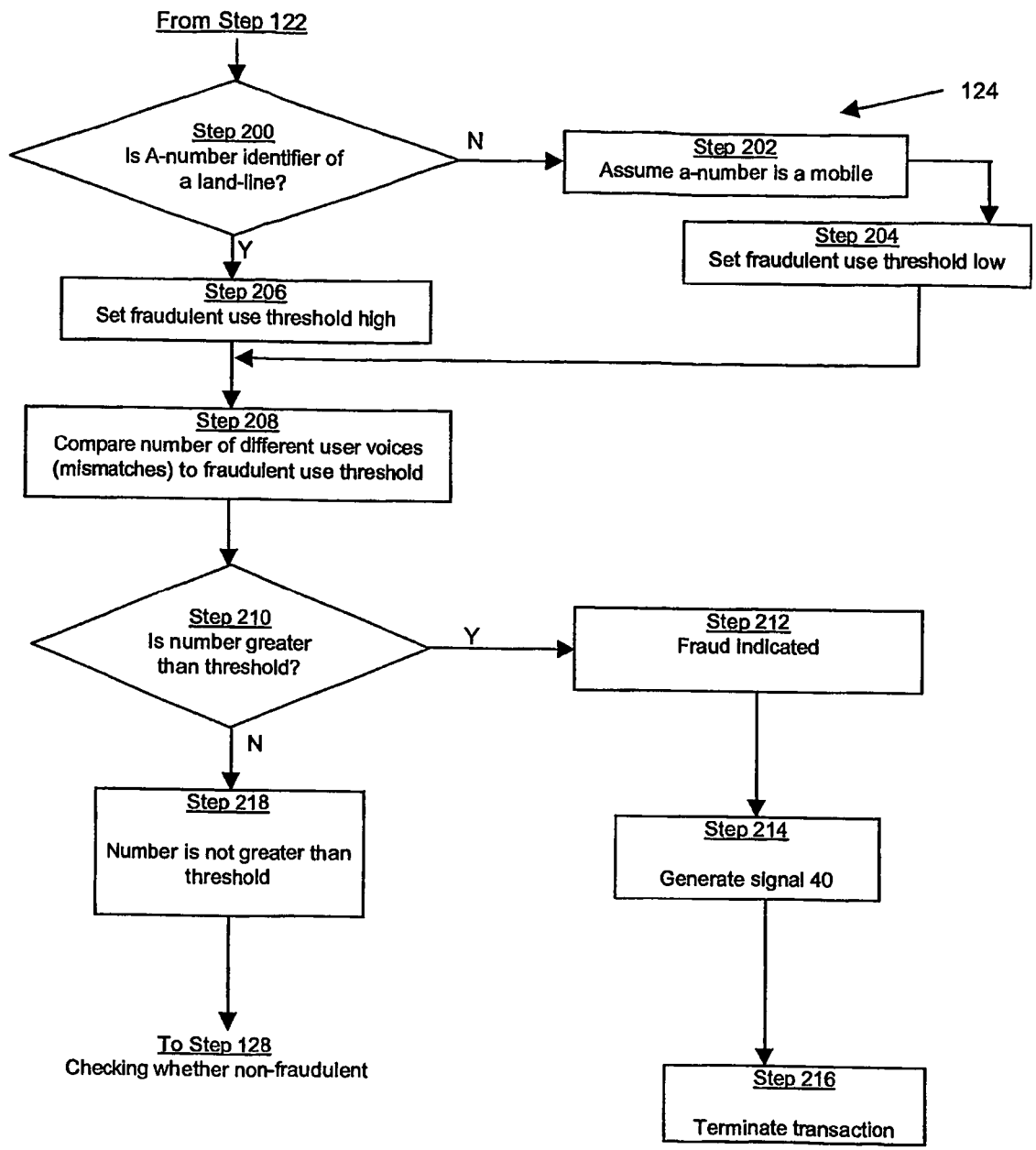
FIG. 5 is a flow diagram illustrating in detail the analysis step, in determining whether a fraudulent transaction is taking place, of the flow diagram of FIG. 4.

FIG. 5 illustrates in further detail, by means of a flow diagram, the method steps involved in the step of determining whether a fraudulent transaction is taking place (step 124). At step 200, a check is made to see whether the A-number identifier indicates the call is originating from a landline telephone number. If it is not, it is assumed that the call is originating from a mobile telephone number (step 202), and hence at step 204 the threshold for fraudulent use is set low (e.g. to a single user, or to a couple of users only). If, at step 200, it is determined that the A-number identifier does indicate a landline call, at step 206 the threshold for fraudulent use is set to a higher threshold value. At step 208, the number of different user voices in the profile of user usage record 46 is compared with the threshold for fraudulent use. If the threshold is exceeded (step 210), there is an indication of a fraud (step 212) and a fraud condition signal 40 is generated to terminate the transaction (steps 214, 216) and, optionally, all services supplied to the A-number. If, at step 210, the number of different user voices does not exceed the threshold for fraudulent use (step 218), then a check is made at step 128 to determine whether there is a positive indication of non-fraudulent use.

Figure 6:
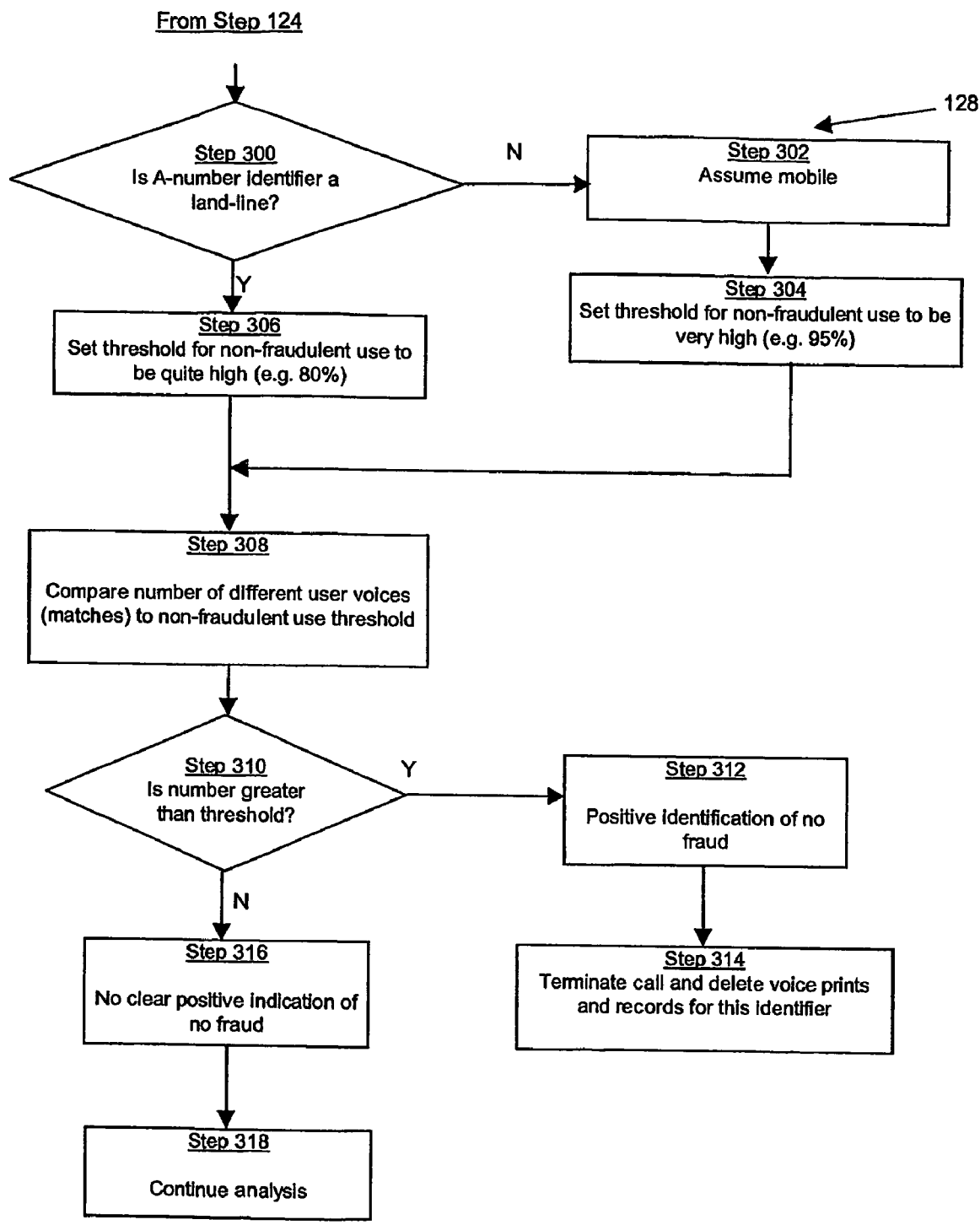
FIG. 6 is a flow diagram illustrating the analysis step, in determining whether a non-fraudulent transaction is taking place, of the flow diagram of FIG. 4.

FIG. 6 illustrates in further detail, by means of a flow diagram, the method steps of the check made at step 128, to determine whether there is a positive indication that fraudulent transactions are not taking place. At step 300, a check is made to see whether the A-number identifier indicates that the originating call is from a landline telephone. If not, an assumption is made at step 302 that the call originates from a mobile telephone. In this case, the threshold for non-fraudulent use is set at step 304 to be very high (e.g. 95%), so that a very high percentage of calls must be identified as having a user that is already associated with the A-number identifier before it can be positively determined that there is no fraud. If the A-number identifier indicates that the originating call is from a landline telephone, the threshold for non-fraudulent use is set to a lower value at step 306, although still relatively high (e.g. 80%), so that a lower percentage of calls must be identified as having a user that is already associated with the A-number identifier before it can be positively determined that no fraud is in progress.

At step 308 the percentage of the total number of calls from an A-number having a voice already associated with the A-number is compared with the percentage threshold for non-fraudulent use. If, at step 310, the threshold is exceeded, there is a positive indication of non-fraudulent use (step 312) and analysis of calls for this A-number identifier is halted. At step 314, the voice-based fraud detection engine may provide an instruction to both the fraud detection system 20 to halt analysis of calls originating from this A-number, and to the voice sampling device 38 to halt voice sampling. Additionally, all information associated with this A-number, as stored in the analysis profile 25 and the voice print archive 39, is deleted.

If it is determined that the percentage of the total number of calls that are identified as having a user that is already associated with the identifier does not exceed the threshold for non-fraudulent use, then there is no clear and positive indication of a lack of fraudulent activity (step 316) and analysis of calls having this A-number is continued (step 318).

Figure 7:
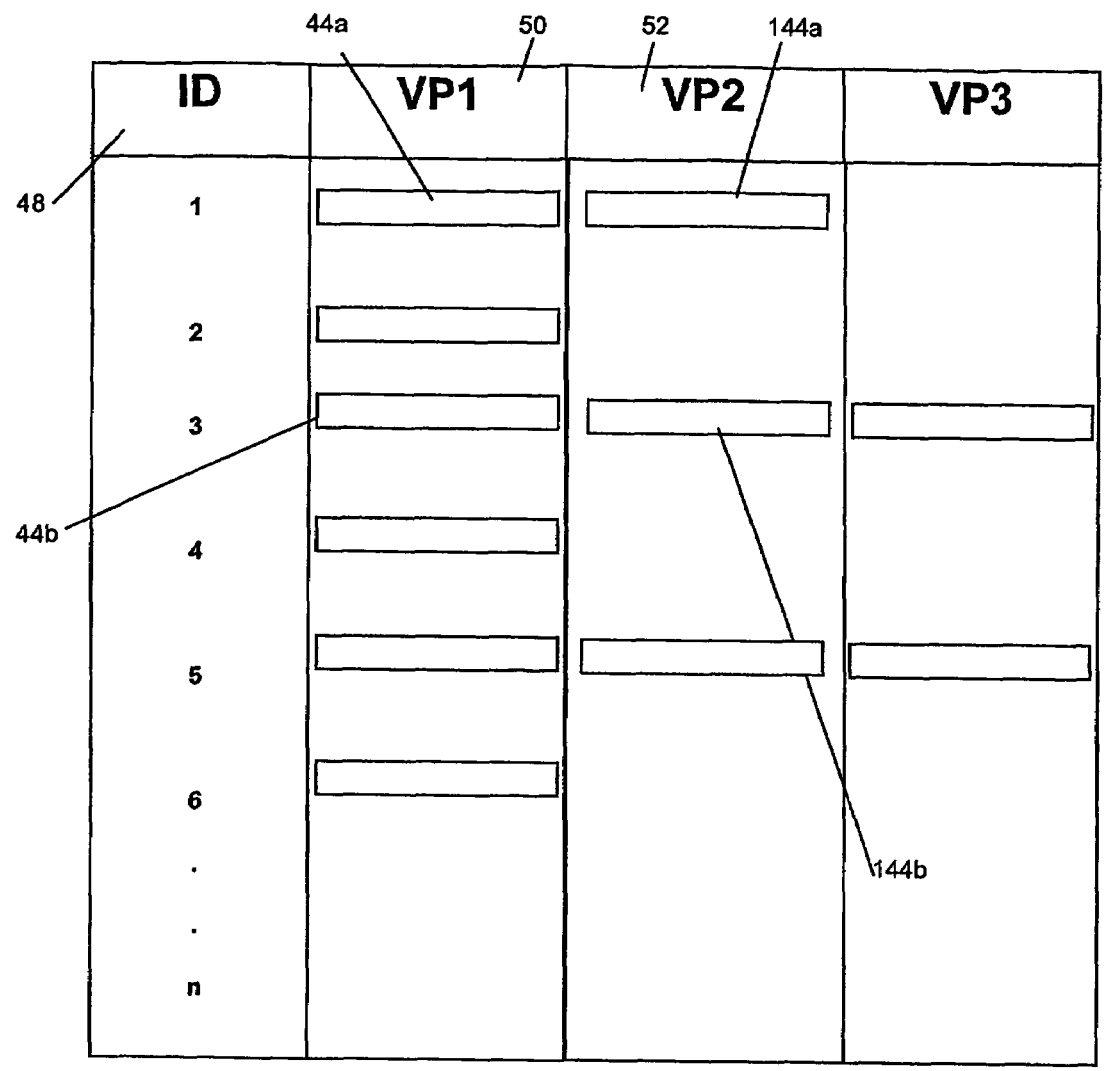
FIG. 7 is an illustration of a voice print archive of the system shown in FIG. 3.

FIG. 7 is a diagram to show the contents of the voice print archive 39 in further detail for each A-number (numbered 1 to n in this example) for which a fraud alert signal 24 has been generated is stored in a first data location 48 of the voice print archive 39. For the first occurrence of voice sampling for a particular A-number identifier, a first voice sample is generated and is converted into a voice print 44a that is stored in a first voice print data location 50 associated with the A-number (e.g. voice print 44a is associated with A-number 1). For the second occurrence of voice sampling for the same A-number identifier a second voice sample is generated and, where the second voice sample does not produce a match with the stored voice print 44a, is converted into a voice print 144a. The voice print 144a is stored in a second voice print data location 52 associated with the A-number 1, and the procedure continues for subsequent voice samples for the same identifier. For a transaction having a different identifier (e.g. 3), a first voice sample generates a first voice print 44b that is stored in the first voice print data location 50 associated with A-number 3, and a second, subsequent voice sample generates a second voice print 144b that is stored (if it does not match the first) in the second voice print data location 52 associated with A-number 3, and so on.

Each new voice sample that is generated by the voice sampling device 38 is compared with the voice prints 44a, 144a, . . . etc that are stored in the voice print archive 39 for the relevant identifier 48. If a current voice sample substantially matches one of the stored voice prints 44a, 144a, . . . the voice verification engine 32 generates a positive comparator output signal. If the current voice sample does not match one of the stored voice prints 44a, 144a, the voice verification engine 32 generates a negative comparator output signal, and a voice print generated from the current voice sample is stored in the next available voice print data location for the current identifier for comparison with subsequent voice samples that are taken for transactions with this identifier.

FIG. 8 illustrates first and second records 46a, 46b that are stored in the analysis profile archive 25, which are representative of the profile of user usage for first and second A-number identifiers, 1 and 2 respectively. In practice the analysis profile archive 25 will include a total of n records, 46a to 46n, for each A-number identifier, 1 to n. Each profile of user usage record includes a numerical representation 53 of the A-number (i.e. A-number 1 for record 46a, A-number 2 for record 46b), a numerical representation 54 of the total number of negative comparative output signals for a given number of voice samples for the A-number, and a pre-determined threshold 56 that represents the maximum number of different users of the particular A-number in question that would be considered representative of normal, non-fraudulent use, and above which there is an indication of fraudulent use. Each record 46a, 46b also includes an indication 58 of the type of identifier, for example a mobile telephone number or a landline telephone number.

For each transaction from which a voice sample is taken (and thus for which a comparative output signal is generated), the voice-based fraud detection engine 26 communicates with the analysis profile archive 25 to check the relevant profile of user usage data record 46a, 46b and to update it accordingly. The voice-based fraud detection engine 26 then compares the total number 54 of negative comparator output signals with the pre-determined threshold 56 for fraudulent use for the A-number in question. If it is determined that the threshold for fraudulent use is exceeded, a fraud condition signal 40 is generated and is supplied to the network 10 to terminate automatically the current transaction of the A-number in question, as illustrated in the flow diagram of FIG. 4, and, optionally, other services supplied to the A-number.

The data record 46 that is representative of the profile of user usage for each identifier also includes a numerical representation of the total number 60 of positive comparative output signals for a given number of voice samples having a common identifier. Each record, 46a to 46n, also includes a pre-determined threshold 62 for non-fraudulent use for the associated A-number. The threshold 62 for non-fraudulent use is a minimum number of transactions for a given identifier, that are identified as having the same user, and above which it can be positively determined that use is normal and there is no fraudulent activity. For each transaction for which a voice sample is taken (and thus for which a comparative output signal is generated), the voice-based fraud detection engine 26 communicates with the analysis profile archive 25, checks the relevant profile of user usage record 46a, 46b and updates the total number 60 of positive comparator output signals, if appropriate. If the total number 60 of positive comparator output signals exceeds this threshold, it can be determined positively that there is no fraudulent activity.

The data record 46 need not necessarily include the thresholds for fraudulent use, however, and these may be stored in a separate data location.

As an alternative to comparing the total number of negative comparator output signals with a threshold representative of a total number of different users, a percentage of the total number of comparative output signals that are negative may be compared with a percentage threshold. For example, suppose voice samples have been taken from ten different transaction calls associated with a particular A-number after a fraud alert signal 24 was generated for the A-number by the fraud detection system 20. The voice-based fraud detection engine 26 may be configured to generate the fraud condition signal 40 to suspend services to the A-number if more than eight different users of the A-number are detected. Thus, a fraud condition signal 40 may be generated if a total of eight negative comparator signals are generated for any one A-number, for every ten transactions that are voice sampled.

A further alternative technique for analysing the profile of user usage records involves comparing the number of sequential positive comparative output signals for a particular identifier with a threshold that is representative of the sequential number of users which is considered to positively confirm non-fraudulent, normal use. If the threshold is reached, further analysis of calls originating from this A-number is halted.

Figure 9:
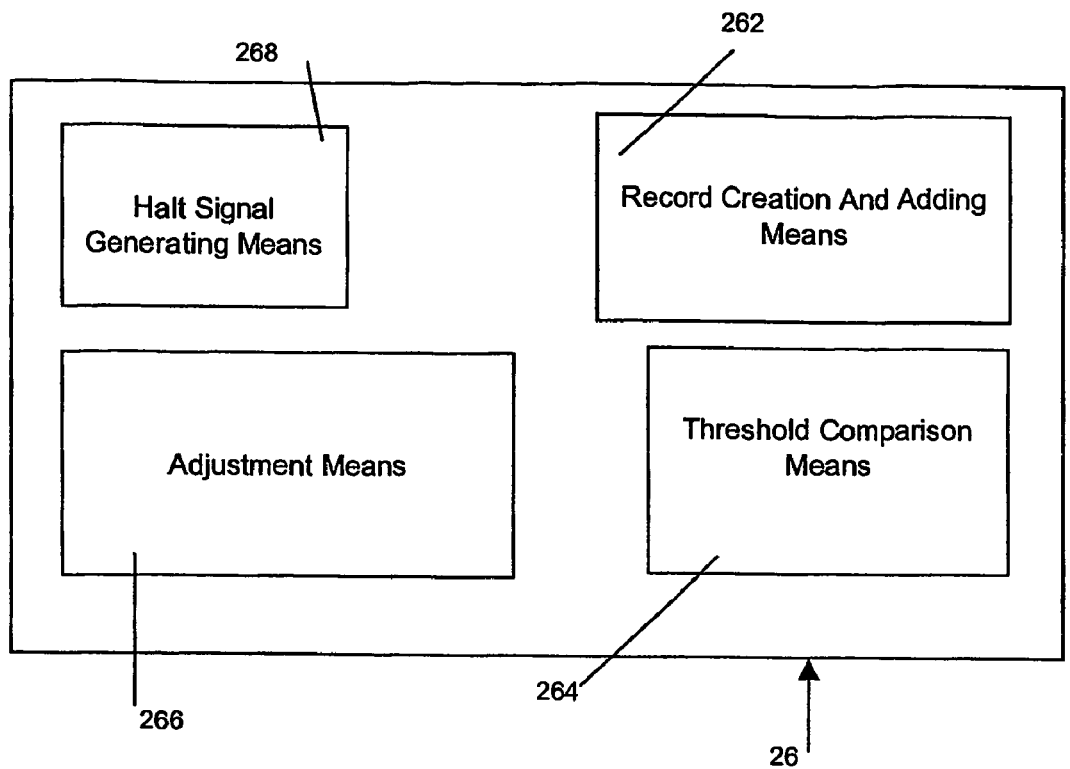
FIG. 9 is a detailed diagram of the voice-based fraud detection engine of the system shown in FIG. 3.

The components of the control means 26 for carrying out the record creation and analysis steps is shown in further detail in FIG. 9. The voice-based fraud detection engine 26 includes record creation and adding means 262 for creating the records 46 in the analysis profile archive 25 and for determining the cumulative total of negative and/or positive comparator output signals, threshold comparison means 264 for comparing the cumulative totals with the thresholds for fraudulent and non-fraudulent use, adjustment means 266 for adjusting the thresholds depending on the A-number characteristics and halt signal generation means 268 for generating a halt signal to terminate further analysis by the fraud detection system 20 for those transactions having an A-number for which a positive indication of non-fraudulent use is provided. The halt signal generation means 268 is also configured to provide a halt signal to an input of the voice-based detection system 21 itself so as to terminate further voice sampling of transactions having this identifier. Conveniently, the halt signal generation means 268 takes the form of a software implemented feedback command loop forming part of the control software for the voice-based fraud detection system 21.

The sampling process continues during all successive transactions for an A-number for which the fraud detection system 20 has generated a fraud alert signal 24, until such time as the total number of negative comparator signals supplied to the voice-based fraud detection engine 26 exceeds a threshold that is indicative of a fraudulent transaction, or until such time as a threshold of positive comparator signals is exceeded to positively indicate that there is no fraudulent activity or until some other threshold for comparison with the profile of user usage is exceeded.

In the present embodiment, more than one voice sample is taken for any one A-number transaction for which a fraud alert signal 24 is generated, so as to ensure that any countermeasures the fraudster may take in light of knowledge of voice sampling do not circumvent the detection of a fraud. It is preferable for the voice samples to be taken at the start of a transaction for which the fraud alert signal 24 is generated, and at random intervals throughout. It will be appreciated that the profile of user usage stored in the analysis archive may be updated for each sample comparison that is made, and this includes when multiple fraud alert signals are generated within a single transaction.

The voice sample device 38 may be of conventional type, and is operable to ensure only the voice of either the user of the originating telephone or the receiver of the transaction of interest is sampled. The voice sample device may generate discrete samples of the user's voice, or may be configured to generate a continuous voice sample represented by a continuous data stream. Call information from the initiating telephone 12*a* is transmitted via channels to the receiver telephone 14*a*. In a 2G mobile telecommunications network, for example, each channel is shared between eight users having use of approximately 13 Kb/s. A GSM speech coder encodes every 20 ms of speech using 260 bits, and channel coding expands this to 456 bits. At the receiver end, a decoder is used to decode the speech bits from the coded signal. Channel coding is also used in signalling channels to protect 184 bits of the 456 bit channel block, and after channel coding all data is ciphered to protect from eavesdropping and passed through a Gaussian minimum shift key modulator for transmission. One time slot carries each voice call, although the network uses other time slots to carry signalling channels. All user and signalling channels are transmitted in predefined frame structures and each mobile telephone uses allocated time slots. Thus, as user data is transmitted in a frame structure with time slots of voice data, one control channel and an idle frame for power measurement, it can be ensured that only the voice of the user of a particular call, having a particular identifier, is profiled, decoded and sampled.

The system of the invention is equally applicable to other telephone data transmission formats, such as 2.5G and 3G mobile telecommunications systems, and it will be understood by those familiar with this technology field how voice sampling of a particular format can be implemented to ensure only the voice of the initiating caller (and the receiver's voice, if required) is sampled by the voice sampling means 38.

Typically, the voice verification engine 32 of the voice-based fraud detection system 21 may take the form of an off-the-shelf speaker verification package (such as Persay's Orpheus speaker verification package), which may be configured to provide a binary comparator output signal to indicate whether there is a positive voice match between a stored voice print and the current voice sample or whether there is a negative match between the current voice sample and a stored voice print.

The voice verification engine 32 may operate on the basis that the current voice sample is compared with the or each stored voice print to determine whether it is probable that the current voice sample could have generated the stored voice print. So, for example, there is considered to be a "match" if the current voice sample could have generated the store voice print, and a "mis-match" if the current voice sample could not have generated the stored voice print. It will be appreciated by persons familiar with voice verification engines, however, that other comparison tests for determining whether there is a match or a mis-match may be used.

In practice, it may be convenient if the analysis profile archive 25 occupies a computer memory location that is shared by the voice-based fraud detection system 21 and the fraud detection system 20.

The voice-based fraud detection system 21 of the first embodiment of the present invention enhances the capabilities of conventional fraud detection schemes, and the provision of the fraud detection system 20 fulfils a role of analysis selection such that the voice verification steps performed by the voice-based fraud detection system 21 need only be invoked for those identifiers for which the fraud detection system has generated a fraud alert signal 24. This is a highly desirable arrangement in practice, as only a subset of the total number of transactions need be sampled and analysed, thereby reducing the processing and storage requirements of the system.

It will be appreciated that the functions performed by the fraud detection system 20 and the voice-based fraud detection system 21 may be implemented in software by means of a common, programmable computer processor. Alternatively, the first level fraud detection function performed by the fraud detection system 20 and the second level voice-based fraud detection function performed by the voice-based fraud detection engine 26 may be implemented by means of separate computer processors.

As an alternative to providing automatic termination of a suspect transaction in the event that the threshold for fraudulent use is exceeded, the voice-based fraud detection system 21 may be arranged to generate a visual, audible or other fraud condition signal to alert an operator of the system that a fraudulent transaction is taking or has taken place. The generation of the fraud condition signal may prompt a team of fraud investigators to intervene, to determine whether suspension or termination of the services associated with the A-number identifier is appropriate, or whether further analysis of transactions associated with the identifier should be considered.

The precise details of the operation of the voice-based fraud detection system 21 and the selection means 20 will vary from one deployment to another, depending on such factors as the anti-fraud policies of the network operator, the quality of the speech signal that can be sampled from the network using the voice sampling device 38, the performance of the voice verification engine 32 that is used and the volume of voice traffic on the network 10. For example, if a high-speed voice verification engine 32 is used, it may be possible to monitor all calls on a telecommunications network so that the selection means 20 can be configured to select all active identifiers for analysis.

It may be that the false mismatch rate of such a high-speed voice verification device 32 may be so high that services to a particular A-number can only be suspended if a high proportion of calls produce mis-matched voice samples. For example, in such circumstances it may be necessary for at least seventy calls out of eighty originating from a particular A-number to produce at least one mismatch between voice samples and stored voice prints before the service is terminated.

Figure 10:
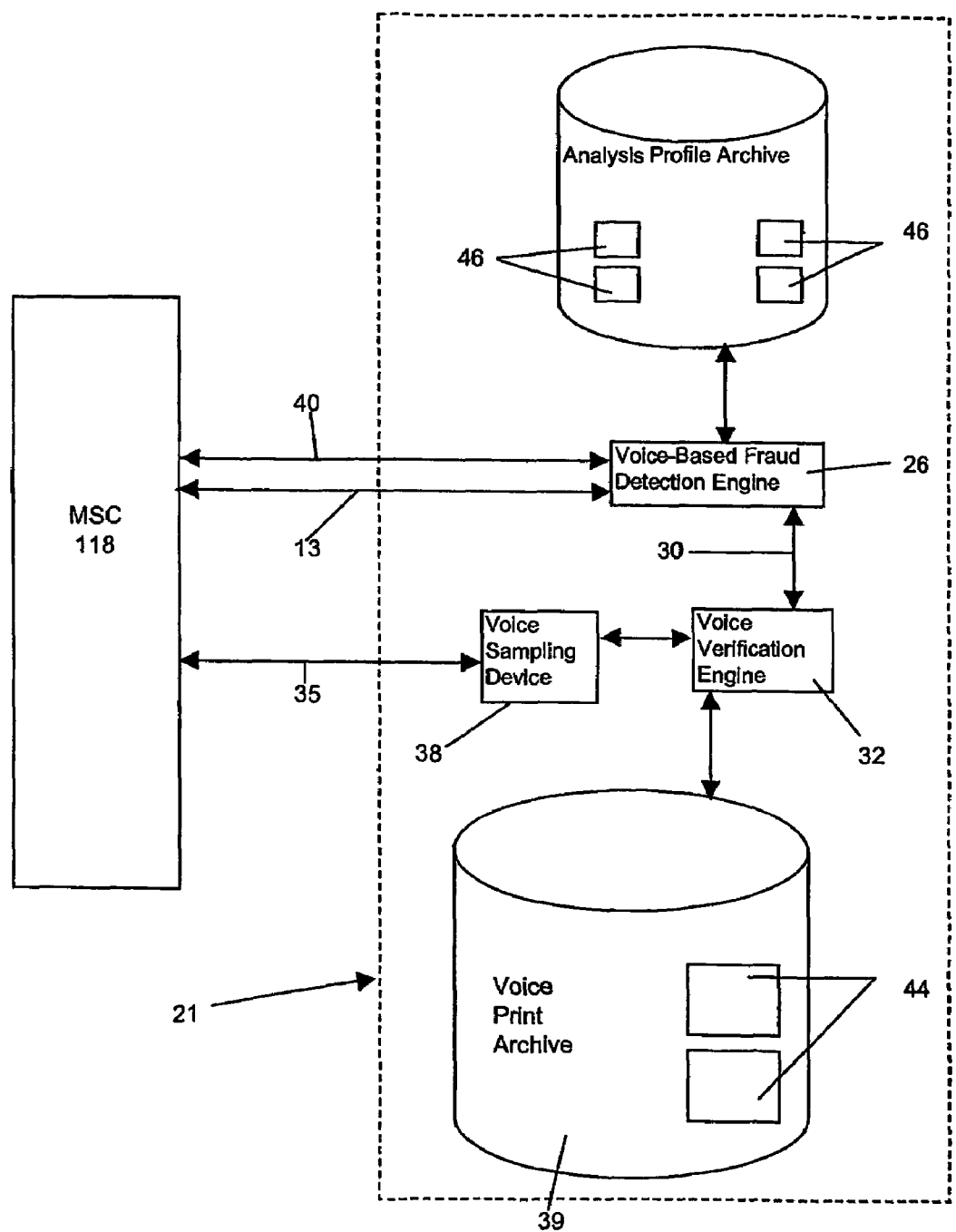
FIG. 10 is a schematic diagram of a system according to an alternative embodiment of the invention, similar to that shown in FIG. 3 but in which the fraud detection engine is absent.

It will therefore be appreciated that the provision of the selection means 20 is not essential in all of the embodiments of the invention, such that every call transmitted over the network 10 may be monitored for possible fraudulent activity. FIG. 10 illustrates a similar but alternative embodiment to that shown in FIG. 3. For the sake of brevity, the following description is restricted to the differences between these embodiments. The major difference is that in which the fraud detection system 20 in FIG. 3 is absent from the voice-based fraud detection system 21. Data signals 13 from the network 10 are supplied directly to the voice-based fraud detection engine 26.

Figure 11:
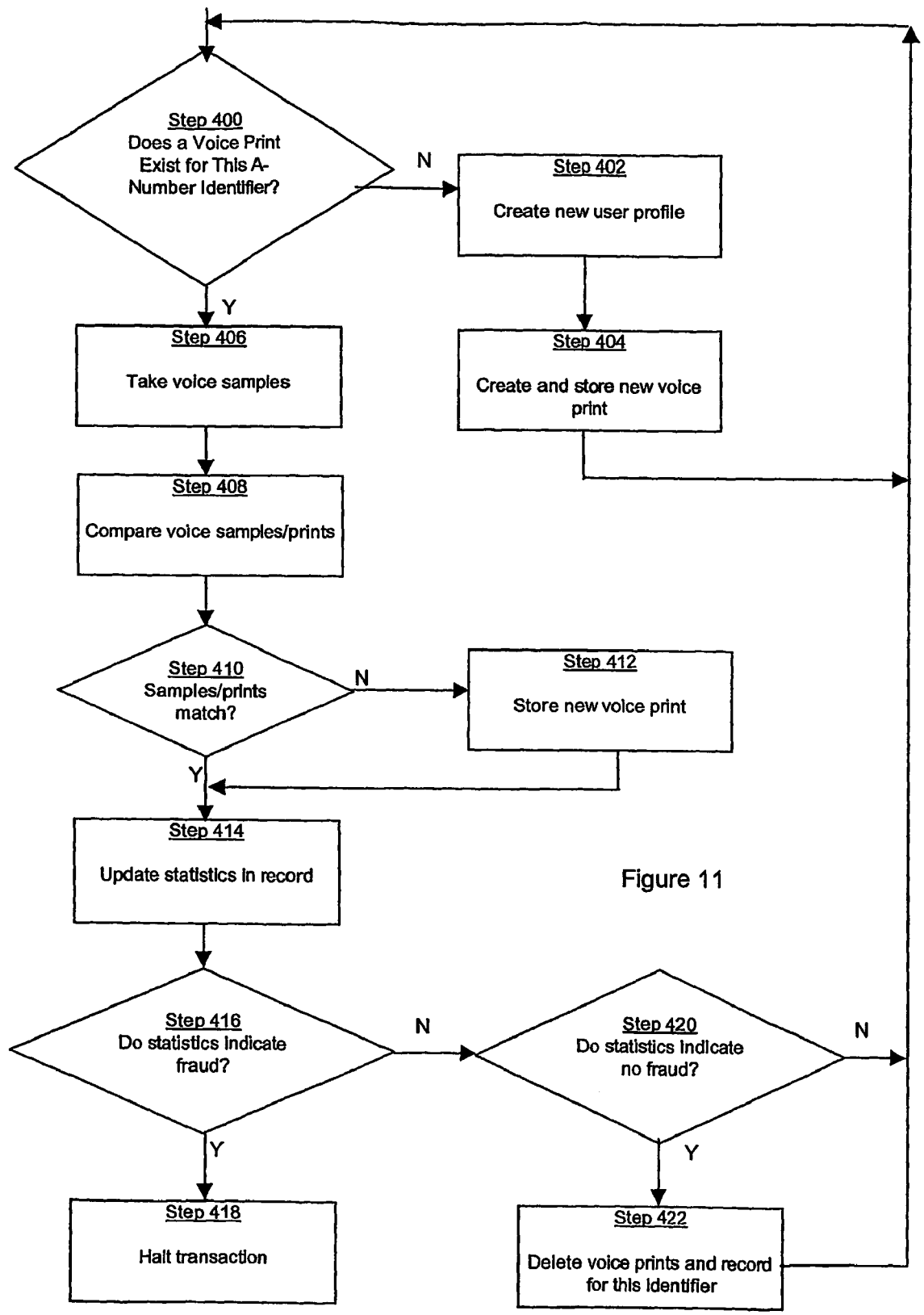
FIG. 11 is a flow diagram illustrating the steps of operation for the system shown in FIG. 10.

FIG. 11 illustrates the method steps of operation for the system of FIG. 10 by means of a flow diagram. At step 400, a check is made to determine whether a voice print exists for the A-number identifier of the current transaction. If not, a new profile of user usage record is created in the analysis profile at step 402 and a voice sample is taken and converted into a voice print, which is stored in the voice print archive 39 at step 404. If a voice print already exists for the current A-number identifier, a voice sample is taken at step 406 and is compared at step 408 with the or each existing voice print. At step 410, a determination is made as to whether the current voice sample matches a previous, stored voice print. If there is no match, a voice print is generated from the current voice sample, and this voice print is added to the voice print archive at step 412. Subsequently (step 414), or if the current voice sample does match one of the stored voice prints, the statistics in the profile of user usage data record 46 are updated, as shown in FIG. 5. At step 416 a determination is made as to whether the transaction is fraudulent. If yes, the transaction is halted at step 418. If no, a check is made at step 420 to see whether there is a positive indication that no fraudulent activity is taking place. If there is no positive indication at step 420 that transactions have been non-fraudulent, monitoring of further transactions continues. If there is a positive indication that fraud has not taken place at step 420, the voice prints are deleted from the voice print archive 39 for this identifier, and the profile of user usage record is deleted from the analysis archive 25 (step 422).

In a further alternative embodiment, a selection means 20 is provided in a similar manner to the first embodiment. However, the selection means 20 is configured to periodically sample data from calls transmitted over the network 10 so that only a fraction of calls are sampled, rather than selecting calls for analysis in dependence upon call characteristics (as in the first embodiment).

Depending on the role of the selection means 20, the invention can monitor all calls, arbitrary subsets of calls, such as only calls that a conventional fraud detection system 20 considers to be of suspicious nature. The configuration of the voice fraud detection system can be altered to cope with differences in the performance of various voice verification packages and variability in the quality of speech samples taken from networks.

In a further embodiment the voice-based fraud detection engine may be used to provide an indication that a suspected fraud has occurred rather than halt the further use of the identifier. This may be further investigated by a use characteristics fraud detection engine (such as the fraud detection system 20) that analyses, for example, the rate of use of the identifier, the manner of use of the identifier, the duration of each use of the identifier, or the types of transaction conducted with the identifier by statistical or other methods. Furthermore or instead an alert can be generated for further investigation by a fraud investigation team.

Having described several embodiments of the present invention, it is to be appreciated that the embodiments in question are exemplary only and that variations and modifications such as will occur to those possessed with the appropriate knowledge and skill may be made without departure from the spirit and scope of the invention as set out in the accompanying claims. For example, the present invention is not limited to application in detecting fraudulent call transactions themselves but may be applied to credit card transactions implemented over a telecommunications network. The identifier may be a credit card number or other payment card number, for example, which would usually be expected to be used by a single user only, just two users (e.g. husband and wife) or a small number of users (e.g. work colleagues using a company payment card). In this case, the fraud detection system 20 is configured to provide a fraud alert signal 24 in the event that a deviation from the behavioral profile of use associated with the card number is detected. In this case, the fraud detection system 20 supplies a fraud alert signal 24 to the voice-based fraud detection system 21, which in turn provides the control signal 34 to the voice sampling device 38 to initiate a voice sample process. Typically, the voice of the user may be sampled when stating a card password or code word (e.g. the maiden name of the user's mother, or the user's date of birth). It is also preferable to sample the voice of the user periodically throughout the conversation. The voice verification device 32 compares this with the or each previous, stored voice print, as described previously. As before, if no stored voice print exists the voice sample is converted into a voice print, which is stored for comparison with a subsequent voice sample taken from a subsequent transaction associated with the same identifier.

Furthermore, the system operator may generate all of the voice samples of transaction users, but it is also envisaged that the first voice print of a user of an identifier may be generated and stored at the time the identifier is assigned to the user (for example, when a particular mobile telephone number is assigned to a user). The database of voice prints may therefore be created and maintained by someone other than the system operator, and this database may then be made available, as and when required, for example over the internet. It is therefore not essential that the system of the present invention includes the voice print archive 39, nor the voice sampling device 38, as both may be provided and maintained by an alternative service provider. If the invention is implemented in this manner, it will therefore also be appreciated that for any voice sample that is taken there will always be at least one pre-stored voice sample in existence already with which it can be compared, even for the first initiation of voice sampling by the voice-based fraud detection system 26.

While the above detailed description has shown, described and pointed out various features of the invention as applied to various embodiments, it will be understood that various omissions and substitutions and changes in the form and details of the illustrated system and method may be made by those skilled in the art, without departing from the spirit of the invention.

What is claimed is:

1. A system for the automatic detection of fraudulent activity on a transaction network, for which each transaction over the network has an identifier associated therewith, the system comprising: voice comparison means for comparing a first sampled voice of a user of a first transaction with a subsequently sampled voice of a user of a subsequent transaction having an identical identifier to that of the first transaction, and control means for determining, from said comparison, a profile of user usage that is representative of a number of different users of the identifier, for comparing the profile of user usage with a threshold for fraudulent use and for generating a fraud condition signal in the event that the profile of user usage exceeds said threshold.

2. The system as claimed in claim 1, further comprising voice sampling means for sampling a voice of the user of the first transaction to generate a first voice sample, and for sampling a voice of the user of the subsequent transaction to generate a subsequent voice sample.

3. The system as claimed in claim 2, wherein said voice comparison means is arranged to generate a first voice print from said first voice sample.

4. The system as claimed in claim 3, further comprising voice print storage means for storing said first voice print.

5. The system as claimed in claim 3, further comprising selection means configured to initiate voice sampling by the voice sampling means only for selected transactions.

6. The system as claimed in claim 5, wherein the selection means is configured to periodically initiate voice sampling of transactions.

7. The system as claimed in claim 5, wherein the selection means includes a fraud detection system for determining whether a transaction has a fraudulent characteristic and for generating a fraud alert signal in the event thereof, and whereby voice sampling is initiated in response to generation of the fraud alert signal.

8. The system as claimed in claim 7, wherein the fraud detection system includes means for comparing a use profile for the identifier with one or more characteristics of a transaction associated with the identifier, thereby to determine whether the transaction has a fraudulent characteristic.

9. The system as claimed in claim 3, wherein the voice sampling means is configured to sample a voice of a user several times for each transaction that is selected for voice sampling.

10. The system as claimed in claims 3, wherein the voice comparison means is arranged to generate a positive comparative output signal for each subsequent voice sample which is substantially matched with a stored voice print and a negative comparative output signal for each subsequent voice sample which does not substantially match a stored voice print.

11. The system as claimed in claim 10, wherein the profile of user usage for an identifier includes a representation of a total number of negative comparative output signals for said identifier, and wherein said threshold for fraudulent use is a maximum number of different users of the identifier above which there is an indication of fraudulent use.

12. The system as claimed in claim 10, wherein the profile of user usage includes a representation of a percentage of the total number of comparative output signals that are negative comparative output signals.

13. The system as claimed in claim 10, wherein the control means includes halt signal means for generating a halt signal which serves to halt analysis of transactions having an identifier for which the profile of user usage provides a positive indication of non-fraudulent use.

14. The system as claimed in claim 13, wherein the control means is arranged to compare the profile of user usage with a threshold for non-fraudulent use, and wherein the halt signal means is arranged to generate the halt signal in the event that the profile of user usage exceeds said threshold for non-fraudulent use.

15. The system as claimed in claim 14, wherein the profile of user usage includes a representation of a total number of positive comparative output signals for said identifier, and wherein said threshold for non-fraudulent use is a minimum number of transactions having the same user which is indicative of non-fraudulent use.

16. The system as claimed in claim 14, wherein the profile of user usage includes a representation of a percentage of the total number of comparative output signals that are positive comparative output signals.

17. The system as claimed in claim 3, wherein the profile of user usage includes a representation of one or more characteristics of the associated identifier.

18. The system as claimed in claim 17, wherein the control means includes adjustment means for adjusting at least one of the threshold for fraudulent use and the threshold for non-fraudulent use for an associated identifier in response to one or more of said associated identifier characteristics.

19. The system as claimed in claim 1, further comprising a record storage means for storing data records that are representative of the profile of user usages.

20. The system as claimed in claim 1, wherein the identifier includes data of alphabetic, numeric or alphanumeric character.

21. The system as claimed in claim 1, wherein the transaction network is a telecommunications network.

22. The system as claimed in claim 21, wherein the transaction is a telephone call.

23. The system as claimed in claim 22, wherein the identifier is a telephone number unique to a mobile telephone or to a landline telephone connection.

24. The system as claimed in claim 21, wherein the transaction is a payment for goods and/or services.

25. The system as claimed in claim 24, wherein the identifier is a payment card number.

26. The system as claimed in claim 1, wherein the control means is arranged to automatically supply the fraud condition signal to the transaction network, thereby to implement automatic termination of a fraudulent transaction.

27. A system for the automatic detection of fraudulent activity on a transaction network, for which each transaction over the network has an identifier associated therewith, the system comprising a voice comparator for comparing a first sampled voice of a user of a first transaction with a second sampled voice of a user of a subsequent transaction having an identical identifier to that of the first transaction, and a controller for determining, from said comparison, a profile of user usage for the identifier that is representative of how many different users of the identifier there are, for comparing the profile of user usage with a threshold for fraudulent use and for generating a fraud condition signal in the event that the profile of user usage exceeds said threshold.

28. A method of automatic detection of fraudulent activity on a transaction network, for which each transaction over the network has an identifier associated therewith, the method comprising: comparing a first sampled voice of a user of a first transaction with a subsequent sampled voice of a user of a subsequent transaction having an identical identifier to that of the first transaction, determining, from said comparison, a profile of user usage for said identifier that is representative of a number of different users of the identifier, comparing the profile of user usage with a threshold for fraudulent use, and generating a fraud condition signal in the event that the profile of user usage exceeds said threshold.

29. A method as claimed in claim 28, including sampling a voice of the user of the first transaction to generate a first voice sample, generating a first voice print from said first voice sample and storing the first voice print with the associated identifier in a voice print archive, sampling a voice of the user of the subsequent transaction to generate a subsequent voice sample, and comparing the subsequent voice sample with the first voice print for the purpose of determining the profile of user usage for said identifier.

30. The method as claimed in claim 29, including automatically supplying the fraud condition signal to the transaction system to implement automatic termination of a fraudulent transaction.

31. The method as claimed in claim 29 additionally comprising:
providing an initial indication of whether a transaction has a fraudulent characteristic using fraud detection means,
generating a fraud alert signal in the event that the initial indication is that the transaction has a fraudulent characteristic, and
selectively initiating voice sampling in response to generation of the fraud alert signal by the fraud detection system.

32. A fraud detection system for detecting fraudulent activity on a transaction network, for which each transaction over the network has an identifier associated therewith, the system comprising:
a voice comparator for comparing a first sampled voice of a user of one of the identifiers with a subsequently sampled voice of a user of the same identifier taken during a subsequent use of said same identifier;
a profiler for building a profile of usage by users of said same identifier based on the voice comparisons, such that the profile is representative of a number of different users of the identifier; and,
a fraud detector for comparing the number of different users represented in the profile as using the identifier to a threshold indicative of fraudulent use, wherein in the event that the number of users exceeds the threshold a fraud alert signal is generated.

33. A method of automatic detection of fraudulent activity on a transaction network, for which each transaction over the network has an identifier associated therewith, the method comprising:
sampling a first voice of a user of one of the identifiers;
subsequently sampling a second voice of a user of the same identifier;
comparing the first sampled voice with the subsequently sampled voice;
profiling usage by users of said same identifier based on the voice comparisons, such that the profile is representative of a number of different users of the identifier;
comparing the number of different users represented in the profile as using the identifier to a threshold indicative of fraudulent use; and,
generating a fraud alert signal in the event that the number of users exceeds said threshold.

34. A fraud detection system for detecting fraudulent activity on a transaction network, for which each transaction over the network has an identifier associated therewith, the system comprising:
a voice based fraud detection engine for sampling the voice of each user of the identifier during each use of the identifier using a voice analysis technique to identify the number of unique users of the identifier and to indicate the presence of fraudulent use when the number of unique users of the identifier exceeds a threshold; and,
a fraud alert generator to signal presence of fraudulent activity when the voice based fraud detection engine indicates the presence of fraud.

35. A fraud detection system for detecting fraudulent activity on a transaction network, for which each transaction over the network has an identifier associated therewith, the system comprising:
a use characteristics fraud detection engine for analysing characteristics of the use of the network to determine whether fraud is indicated in the use of one of the identifiers;
a voice based fraud detection engine for sampling the voice of each user of the identifier during each use of the identifier using a voice analysis technique to identify the number of unique users of the identifier and to indicate the presence of fraudulent use when the number of unique users of the identifier exceeds a threshold; and,
a fraud alert generator to signal presence of fraudulent activity when both of the use characteristics fraud detection engine and the voice based fraud detection engine indicate the presence of fraud.

36. A fraud detection system as claimed in claim 35, wherein use characteristics fraud detection engine analyses one or more of the following to determine that there is an indication of fraudulent use of the identifier: the rate of use of the identifier, the manner of use of the identifier, the duration of each use of the identifier, or the types of transaction conducted with the identifier.

37. A fraud detection system as claimed in claim 34, wherein the voice based fraud detection engine of the system comprises:
a voice comparator for comparing a first sampled voice of a user of one of the identifiers with a subsequently sampled voice of a user of the same identifier taken during a subsequent use of said same identifier;
a profiler for building a profile of usage by users of said same identifier based on the voice comparisons, such that the profile is representative of a number of different users of the identifier; and, a fraud detector for comparing the number of different users represented in the profile as using the identifier to a threshold indicative of fraudulent use, wherein in the event that the number of users exceeds the threshold a fraud alert signal is generated.

38. A method of automatic detection of fraudulent activity on a transaction network, for which each transaction over the network has an identifier associated therewith, the method comprising:

sampling the voice of each user during each use of said identifier and using a voice analysis technique to identify the number of unique users of the identifier to indicate the presence of fraudulent use in the event that the number of unique users of the identifier exceeds a threshold indicative of fraudulent use; and, generating a fraud alert for signalling presence of fraudulent activity when the voice based analysis indicates the presence of fraud.

39. A method of automatic detection of fraudulent activity on a transaction network, for which each transaction over the network has an identifier associated therewith, the method comprising:

analysing characteristics of the use of the network to determine whether fraud is indicated in the use of one of the identifiers;

sampling the voice of each user during each use of said identifier and using a voice analysis technique to identify the number of unique users of the identifier to indicate the presence of fraudulent use in the event that the number of unique users of the identifier exceeds a threshold indicative of fraudulent use; and, generating a fraud alert for signalling presence of fraudulent activity when both of the use characteristics analysis and the voice based analysis indicate the presence of fraud.

40. A method as claimed in claim 39, wherein the analysis of characteristics of the use of the network includes the steps of: analysing one or more of the following to determine that there is an indication of fraudulent use of the identifier: the rate of use of the identifier, the manner of use of the identifier, the duration of each use of the identifier, or the types of transaction conducted with the identifier.

41. A method as claimed in claim 38, wherein the voice analysis technique of the method comprises the steps of:

comparing one of the sampled voices with a subsequently sampled other of the voices;

profiling usage by users of said same identifier based on the voice comparisons, such that the profile is representative of a number of different users of the identifier;

comparing the number of different users represented in the profile as using the identifier to a threshold indicative of fraudulent use; and, generating a fraud alert signal in the event that the number of users exceeds said threshold.

* * * * *